US012607901B2

(12) United States Patent　　　(10) Patent No.:　US 12,607,901 B2

Wu et al.　　　　　　　　　　　　(45) Date of Patent:　Apr. 21, 2026

(54) OPTICAL ELEMENT DRIVING MECHANISM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW)

(73) Assignee: Actutek Corporation, Taoyuan City (TW)

(*) Notice: Subject to any disclaimer, the term of this patent is extended or adjusted under 35 U.S.C. 154(b) by 252 days.

(21) Appl. No.: 18/495,400

(22) Filed: Oct. 26, 2023

(65) Prior Publication Data

US 2024/0142747 A1　　May 2, 2024

Related U.S. Application Data

(60) Provisional application No. 63/420,236, filed on Oct. 28, 2022.

(51) Int. Cl.
　　*G03B 5/00*　　　　　(2021.01)
　　*G02B 3/14*　　　　　(2006.01)
　　　　　　　　(Continued)

(52) U.S. Cl.
　　CPC ................. *G03B 5/00* (2013.01); *G02B 3/14* (2013.01); *G02B 7/08* (2013.01); *G02B 27/646* (2013.01);
　　　　　　　　(Continued)

(58) Field of Classification Search
　　CPC ...... G02B 27/646; G02B 6/3514; G02B 7/08; G02B 7/09; G02B 7/182; G02B 15/173; G02B 15/14; G02B 15/177; G02B 15/22;

G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08;
(Continued)

(56) References Cited

U.S. PATENT DOCUMENTS

2021/0302690 A1 *　9/2021　Lin ........................... G02B 7/09

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57)　　　　　　ABSTRACT

An optical element driving mechanism is for accommodating a first optical element and includes a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodating space configured to accommodate the first optical element.

19 Claims, 14 Drawing Sheets

(51) Int. Cl.
   *G02B 7/08*         (2021.01)
   *G02B 27/64*       (2006.01)
   *G03B 13/36*       (2021.01)

(52) U.S. Cl.
   CPC ...... *G03B 13/36* (2013.01); *G03B 2205/0069*
                                  (2013.01)

(58) Field of Classification Search
   CPC .............. G02B 26/004; G02B 26/0808; G02B
               26/0816; G02B 27/0911; G02B 27/644;
               G02B 3/14; G02B 7/021; G02B 7/025;
               G02B 7/18; G02B 7/24; G02B 7/28;
               G02B 9/00; G02B 9/24; H04N 5/23287;
               H04N 5/2252; H04N 5/2254; H04N
               5/2329; H04N 5/2257; H04N 5/2253;
               H04N 5/23248; H04N 5/2328; H04N
               5/225; H04N 5/232; H04N 5/23209;
               H04N 5/23212; H04N 5/23245; H04N
               5/23258; H04N 5/23264; H04N 13/0203;
               H04N 13/0239; H04N 13/0296; H04N
               5/222; H04N 5/228; H04N 5/23229;
               H04N 5/23251; H04N 5/23254; H04N
               5/23261; H04N 5/23274; H04N 5/238;
               H04N 23/58; H04N 23/687; H04N 23/55;
               G03B 5/00; G03B 3/00; G03B 3/14;
               G03B 5/02; G03B 5/06; G03B
               2205/0015; G03B 3/10; G03B 2205/0069;
               G03B 2205/002; G03B 2205/0007; G03B
               13/36; G03B 17/02; G03B 17/04; G03B
               17/14; G03B 17/12; G03B 2205/0046;
               G03B 2205/0053; G03B 2205/0092
   See application file for complete search history.

OPTICAL ELEMENT DRIVING MECHANISM

CROSS REFERENCE TO RELATED APPLICATIONS

This application claims the benefit of U.S. Provisional Application No. 63/420,236, filed Oct. 28, 2022, the entirety of which is incorporated by reference herein.

BACKGROUND OF THE INVENTION

Field of the Disclosure

The present disclosure relates to an optical element driving mechanism, and in particular it relates to an optical element driving mechanism with a long focal length and anti-shake function.

Description of the Related Art

As technology has developed, many of today's electronic devices (such as smartphones) have a camera or video-recording functionality. Using the camera modules disposed in electronic devices, users can operate their electronic devices to capture photographs and record videos.

Today's designs for electronic devices continue to follow the trend of miniaturization, meaning that the various components of the camera module and its structure must also be continuously reduced in size, so as to achieve miniaturization. In general, the driving mechanism in a camera module has a camera lens holder configured to hold a camera lens, and the driving mechanism can perform the functions of auto focusing and optical image stabilization. However, although existing driving mechanisms can achieve the aforementioned functions of photography and video recording, they still cannot meet all the needs of users.

Therefore, how to design a camera module capable of performing autofocus, optical anti-shake functions and achieving miniaturization at the same time are topics nowadays that need to be discussed and solved.

BRIEF SUMMARY OF THE INVENTION

Accordingly, one objective of the present disclosure is to provide an optical element driving mechanism to solve the above problems.

According to some embodiments of the disclosure, an optical element driving mechanism is provided for accommodating a first optical element and including a fixed assembly, a movable part and a driving assembly. The movable part is configured to connect a second optical element, the second optical element corresponds to the first optical element, and the movable part is movable relative to the fixed assembly. The driving assembly is configured to drive the movable part to move relative to the fixed assembly. The fixed assembly includes a first accommodating space configured to accommodate the first optical element.

According to some embodiments, the movable part includes a second accommodation space configured to accommodate the first optical element. The second accommodation space is located in the first accommodation space. The second optical element defines an optical axis. The optical axis passes through the second optical element and the first optical element. When viewed along the optical axis, the movable part has a long strip-shaped structure.

According to some embodiments, the fixed assembly further includes a base and an outer frame. The outer frame is fixedly connected to the base and forms the first accommodation space. The base has a base plate with a plate-shaped structure. The fixed assembly further includes a first supporting portion which is disposed on the base to accommodate the first optical element. The first supporting portion extends and protrudes along a first axis from the base plate. The first axis is not parallel to the optical axis. The first optical element is fixedly connected to the first supporting portion.

According to some embodiments, when viewed along the first axis, the first supporting portion has a U-shaped structure and an inclined surface structure. When viewed along the first axis, the U-shaped structure surrounds the inclined surface structure. The first optical element is disposed on the inclined surface structure. A first accommodation groove and a second accommodation groove are formed on the U-shaped structure. When viewed along the first axis, the first accommodation groove and the second accommodation groove are located on opposite sides of the inclined surface structure.

According to some embodiments, a third accommodation groove is formed on the U-shaped structure. When viewed along the first axis, the third accommodation groove is located between the first accommodation groove and the second accommodation groove. The driving assembly includes a first driving element, a second driving element and a third driving element, respectively accommodated in the first accommodation groove, the second accommodation groove and the third accommodation groove. The arrangement directions of the North-pole and South-pole of each of the first driving element and the second driving element are parallel to the optical axis. The arrangement direction of the North-pole and South-pole of the third driving element is parallel to the first axis.

According to some embodiments, the movable part further includes a first side wall, a second side wall and a first opening. When viewed along the optical axis, the first side wall is located on one side of the first optical element. When viewed along the optical axis, the second side wall is located on the other side of the first optical element. When viewed along the optical axis, the first optical element is located between the first side wall and the second side wall. The first opening corresponds to the first optical element. When viewed along the first axis, at least a portion of the first optical element is exposed from the first opening.

According to some embodiments, the movable part further includes a top wall and a second opening. The top wall corresponds to the second optical element. The second opening corresponds to the second optical element and is located on the top wall. The optical axis passes through the second opening. The movable part further includes a third side wall and a fourth side wall. The third side wall is connected between the first side wall and the top wall. The fourth side wall is connected between the second side wall and the top wall.

According to some embodiments, when viewed along the first axis, the third side wall and the fourth side wall each has an L-shaped structure. The movable part further includes a rear side wall which is connected between the first side wall and the second side wall. When viewed along the first axis, there is a gap between the rear side wall and the outer frame. When viewed along the first axis, the movable part encloses the first optical element. The movable part is movable relative to the first optical element. The movable part is not in direct contact with the base.

According to some embodiments, a first accommodation perforation and a second accommodation perforation are respectively formed on the first side wall and the second side wall. A third accommodation perforation is formed on the rear side wall. The first accommodation perforation, the second accommodation perforation and the third accommodation perforation respectively correspond to the first driving element, the second driving element and the third driving element. When viewed along a second axis, the first driving element and the second driving element are respectively exposed from the first accommodation perforation and the second accommodation perforation. When viewed along the optical axis, the third driving element is exposed from the third accommodation perforation.

According to some embodiments, the optical element driving mechanism further includes a circuit assembly, a portion of the circuit assembly is fixedly disposed on the movable part, and other portion of the circuit assembly is fixedly disposed on the base of the fixed assembly. The circuit assembly has a first circuit portion and a second circuit portion. The driving assembly further includes a first coil and a second coil, respectively disposed on the first circuit portion and the second circuit portion and respectively corresponding to the first driving element and the second driving element. The driving assembly further includes a third coil corresponding to the third driving element. The circuit assembly further includes a third circuit portion which is connected between the first circuit portion and the second circuit portion. The third coil is fixedly disposed on the third circuit portion. The first coil, the second coil and the third coil are respectively accommodated in the first accommodation perforation, the second accommodation perforation and the third accommodation perforation.

According to some embodiments, the circuit assembly further includes a bending portion and a fourth circuit portion. The bending portion is connected between the third circuit portion and the fourth circuit portion. The fourth circuit portion is fixedly disposed on the base and is electrically connected to an external control circuit. When viewed along the first axis, the base overlaps a portion of the bending portion, and the bending portion extends from a back side of the base. When viewed along the first axis, the fourth circuit portion extends along the second axis. The fourth circuit portion extends from a side of the base, and the extending direction of the fourth circuit portion is different from the extending direction of the bending portion.

According to some embodiments, the first coil and the second coil are configured to respectively act with the first driving element and the second driving element to generate a first electromagnetic driving force, thereby driving the movable part to rotate around a first rotation axis, so that a pushing portion of the second optical element pushes a main body of the second optical element to change the optical properties of the second optical element.

According to some embodiments, the third coil is configured to act with the third driving element to generate a second electromagnetic driving force, thereby driving the movable part to rotate around a second rotation axis, so that the pushing portion pushes the main body to change the optical properties of the second optical element. The first rotation axis is perpendicular to the second rotation axis. The first circuit portion, the second circuit portion and the third circuit portion are respectively fixedly disposed on the first side wall, the second side wall and the rear side wall of the movable part. When the movable part moves relative to the base, the first circuit portion, the second circuit portion and the third circuit portion move with the movable part relative to the fourth circuit portion.

According to some embodiments, the optical element driving mechanism further includes a connecting assembly, so that the movable part is movably connected to the fixed assembly through the connecting assembly. The connecting assembly includes a first elastic member and a second elastic member. The first elastic member and the second elastic member respectively have a first flexible portion and a second flexible portion. The first flexible portion has flexibility. The second flexible portion has flexibility. When viewed along the optical axis, the first flexible portion and the first optical element are arranged along the second axis. When viewed along the optical axis, a longitudinal axis of the movable part with a long strip-shaped structure is parallel to the second axis. When viewed along the optical axis, the first flexible portion and the second flexible portion are arranged along the second axis. When viewed along the optical axis, the center of the second optical element is located between the first flexible portion and the second flexible portion.

According to some embodiments, the first elastic member has a first connecting end which is fixedly connected to the fixed assembly. The first connecting end is affixed to a first setting portion of the fixed assembly. The first elastic member further has a second connecting end which is fixedly connected to the movable part. The first flexible portion is connected between the first connecting end and the second connecting end. The second elastic member has a third connecting end which is fixedly connected to the fixed assembly. The third connecting end is affixed to a second setting portion of the fixed assembly. The second elastic member further has a fourth connecting end which is fixedly connected to the movable part. The second flexible portion is connected between the third connecting end and the fourth connecting end. When viewed along the optical axis, the first setting portion, the second optical element and the second setting portion are arranged along the second axis.

According to some embodiments, the third side wall and the fourth side wall each have a recessed structure. The third side wall and the fourth side wall respectively correspond to the first setting portion and the second setting portion. The first setting portion and the second setting portion are not in contact with the movable part and the first supporting portion. The first setting portion, the second setting portion, the first supporting portion and the base plate of the base are integrally formed as one piece.

According to some embodiments, when viewed along the optical axis, the first rotation axis is located between the first flexible portion and the second flexible portion. When viewed along the optical axis, the second rotation axis passes through the first flexible portion and the second flexible portion. The first optical element and the second optical element are made of different materials. The first optical element and the second optical element are in different material states. The second optical element is a liquid lens. The first optical element includes a solid lens. The second optical element further includes an optical fixed portion. The optical fixed portion is fixedly connected to the fixed assembly. The optical fixed portion is affixed to the fixed assembly by laser welding. The optical axis passes through the main body. The pushing portion has a ring-shaped structure. When viewed along the optical axis, the optical fixed portion overlaps at least a portion of the connecting assembly.

According to some embodiments, the fixed assembly further includes a third opening. The third opening corresponds to the second optical element. The third opening corresponds to the first optical element. When viewed along the optical axis, the third opening is larger than the second opening. The outer frame has a first outer wall and a second outer wall. The first outer wall and the second outer wall each have a plate-shaped structure. The third opening is formed by the first outer wall and the second outer wall. The first outer wall and the second outer wall are perpendicular to each other. An external light is incident on the third opening in a first direction and is emitted in a second direction from the third opening. The first direction is not parallel to the second direction.

According to some embodiments, a first surface of the first side wall faces the first optical element. A second surface of the first side wall and the first surface face opposite directions. There is a gap between the first surface and the fixed assembly. There is another gap between the second surface and the fixed assembly. A third surface of the second side wall faces the first optical element. A fourth surface of the second side wall and the third surface face opposite directions. There is another gap between the third surface and the fixed assembly. There is another gap between the fourth surface and the fixed assembly. The third surface faces the first surface. The fixed assembly further includes a fourth opening corresponding to the second optical element. When viewed along the first axis, the third opening overlaps at least a portion of the fourth opening. The fourth opening is located at the base.

According to some embodiments, the circuit assembly further includes a bending portion and a fourth circuit portion. The bending portion is connected between the third circuit portion and the fourth circuit portion. The fourth circuit portion is fixedly disposed on the base and is electrically connected to an external control circuit. When viewed along the first axis, a back side wall of the outer frame does not overlap the bending portion. The first supporting portion forms a third accommodation space configured to accommodate the bending portion. When viewed along the first axis, the inclined surface structure overlaps a portion of the third accommodation space. When viewed along the first axis, the inclined surface structure overlaps a portion of the bending portion. When viewed along the first axis, the fourth circuit portion extends along the second axis. The fourth circuit portion extends from a side of the base, and the extending direction of the fourth circuit portion is different from the extending direction of the bending portion.

The present disclosure provides an optical element driving mechanism, which can be a periscope lens mechanism, including a fixed assembly, a driving assembly, a movable part and a connecting assembly. The movable part is movably connected to the base of the fixed assembly through the connecting assembly, and the movable part surrounds the first optical element. The optical fixed portion of the second optical element is affixed to the outer frame of the fixed assembly, and the pushing portion is fixedly connected to the movable part.

The driving assembly is configured to drive the movable part to move relative to the base and the first optical element to drive the pushing portion to push the thin film and the liquid, thereby changing the optical properties of the second optical element, so as to achieve the purpose of optical image stabilization. Because there is a gap between the movable part and the base, the movable part does not collide with the base and cause damage when rotating.

It is worth noting that the first circuit portion to the third circuit portion of the circuit assembly are affixed to the movable part. Therefore, when the movable part moves relative to the base, the first circuit portion to the third circuit portion also move relative to the fourth circuit portion of the circuit assembly, and the bending portion is also driven by the third circuit portion. Based on such a configuration, the overall weight of the movable part can be greatly reduced, and in some embodiments, the weight of the first driving element and the second driving element can also be correspondingly reduced, thereby achieving the purpose of reducing the weight.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
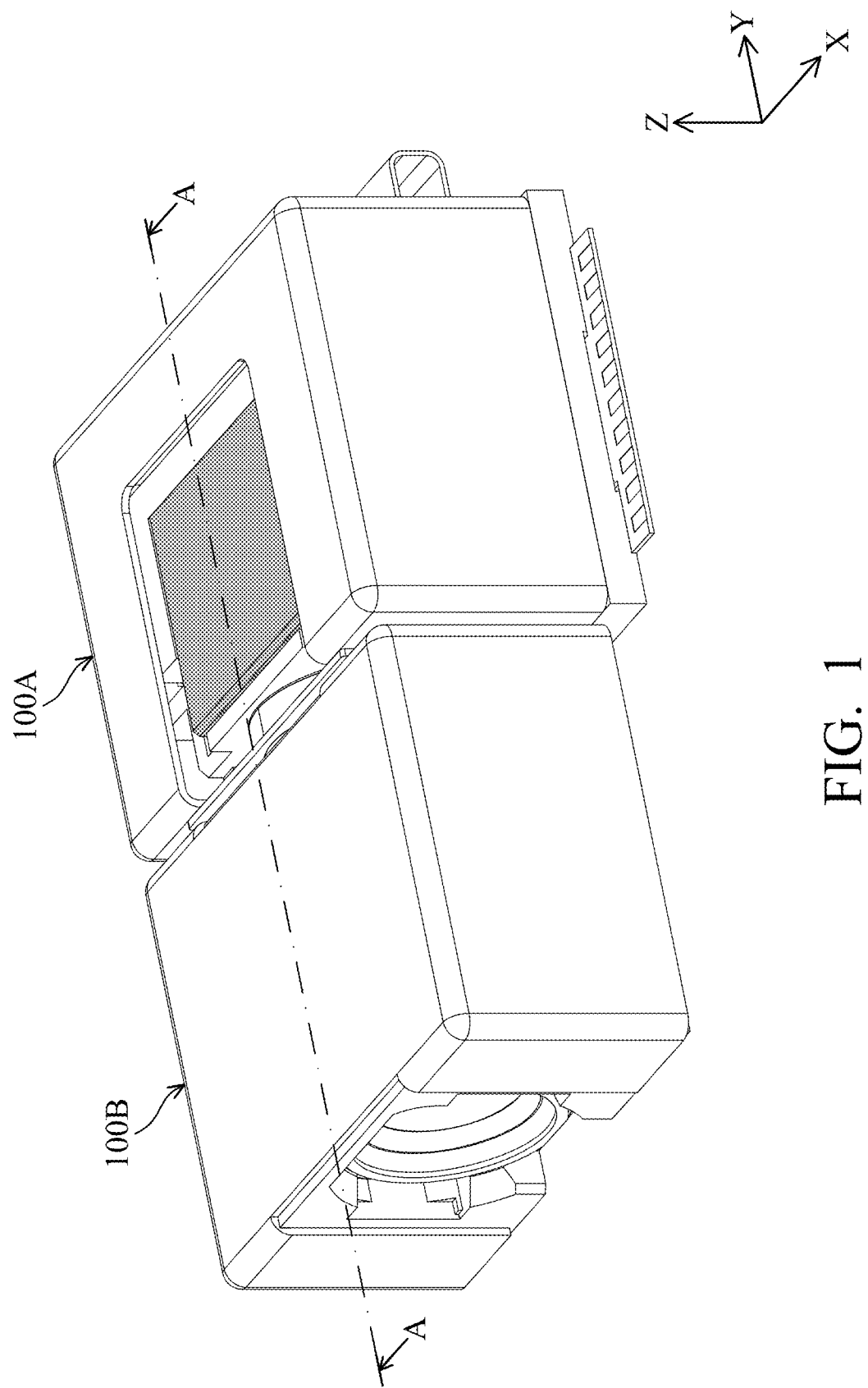
FIG. 1 is a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
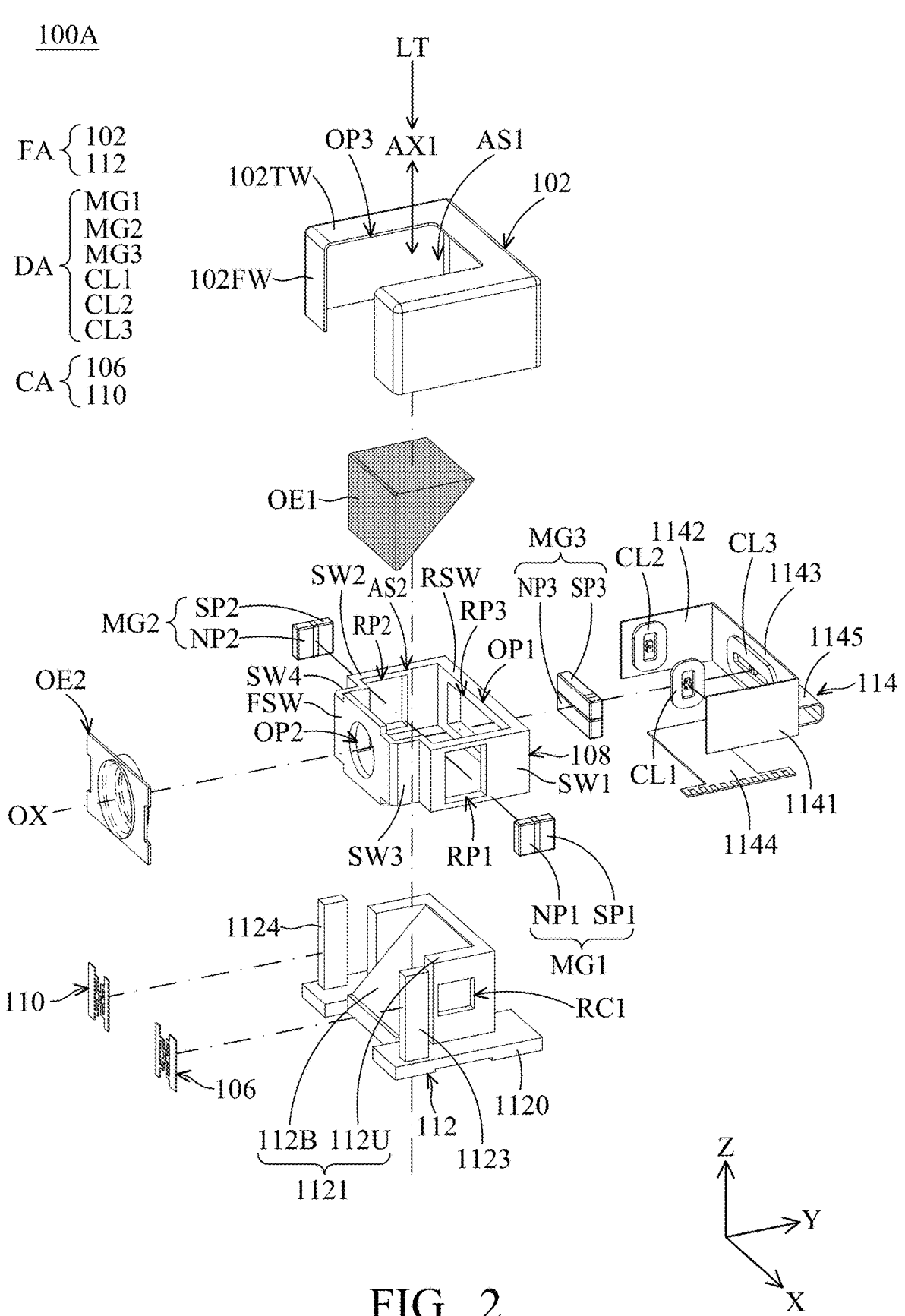
FIG. 2 is an exploded diagram of a partial structure of the optical element driving mechanism 100 according to an embodiment of the present disclosure.
Figure 3:
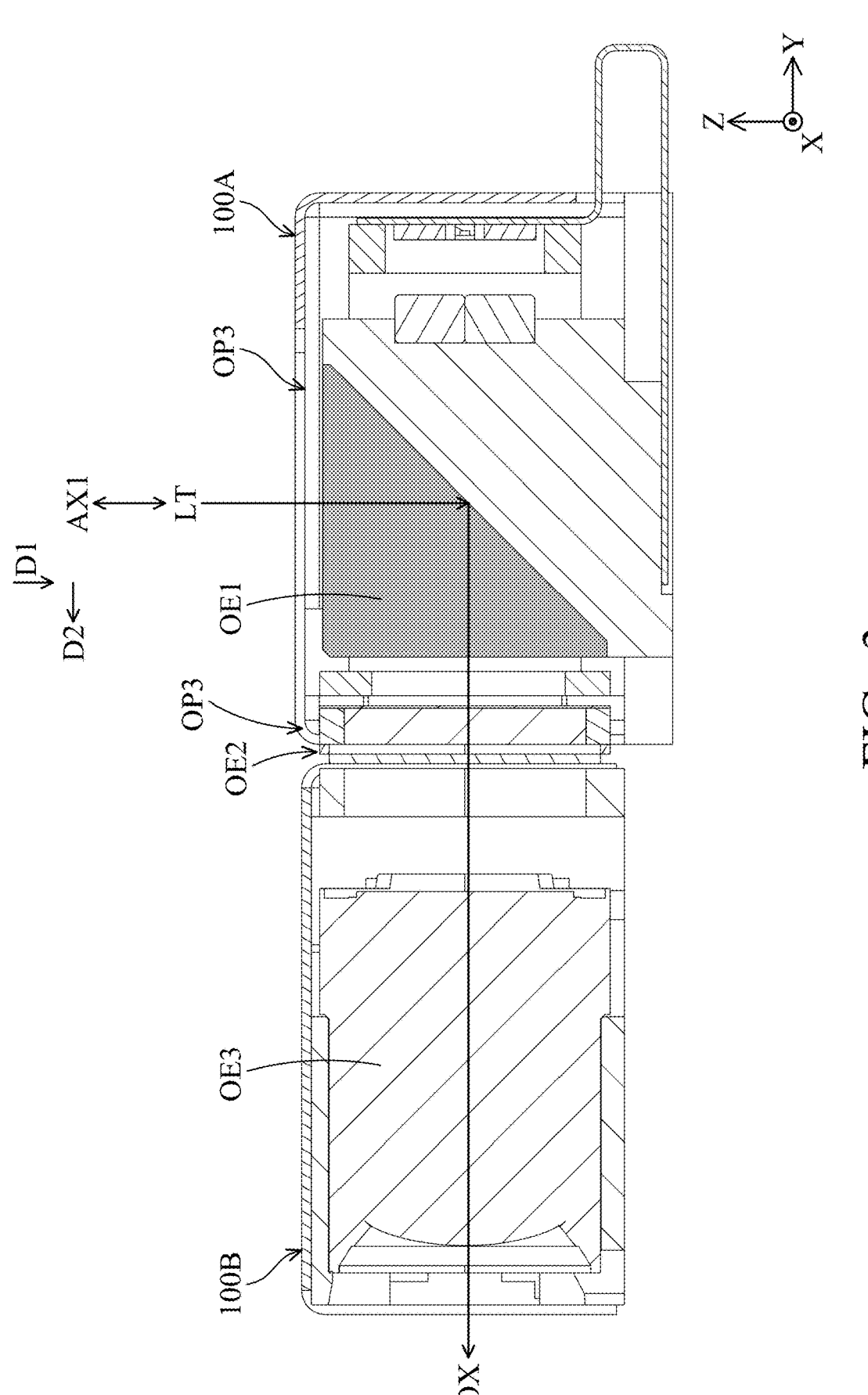
FIG. 3 is a cross-sectional view of the optical element driving mechanism 100 along line A-A in FIG. 1 according to an embodiment of the present disclosure.

Please refer to FIG. 1 to FIG. 3. FIG. 1 is a schematic diagram of an optical element driving mechanism 100 according to an embodiment of the present disclosure, FIG. 2 is an exploded diagram of a partial structure of the optical element driving mechanism 100 according to an embodiment of the present disclosure, and FIG. 3 is a cross-sectional view of the optical element driving mechanism 100 along line A-A in FIG. 1 according to an embodiment of the present disclosure. The optical element driving mechanism 100 can be an optical camera system and can be configured to hold and drive at least one optical element. The optical element driving mechanism 100 can be installed in various electronic devices or portable electronic devices, such as a smartphone, for allowing a user to perform the image capturing function. In this embodiment, the optical element driving mechanism 100 can be a voice coil motor (VCM) with an auto-focusing (AF) function, but it is not limited thereto. In other embodiments, the optical element driving mechanism 100 can also perform the functions of auto-focusing and optical image stabilization (OIS).

In this embodiment, the optical element driving mechanism 100 may include a first optical module 100A and a second optical module 100B. An external light LT enters the first optical module 100A along a first axis AX1 (the Z-axis) and is reflected by a first optical element OE1, then passes through a second optical element OE2 and is emitted from a third optical element OE3 of the second optical module 100B.

The first optical module 100A may have autofocus (AF) and/or optical image stabilization (OIS) functions, and the second optical module 100B may be a fixed lens, or may also have autofocus (AF) and/or optical image stabilization (OIS) functions. In other words, the functions of the two optical modules can be selected and matched with each other according to actual needs.

As shown in FIG. 2, the first optical module 100A may include a fixed assembly FA, a movable part 108, and a driving assembly DA. The movable part 108 is configured to be connected to the second optical element OE2. The second optical element OE2 corresponds to the first optical element OE1, and the movable part 108 is movable relative to the fixed assembly FA. The driving assembly DA is configured to drive the movable part 108 to move relative to the fixed assembly FA.

In this embodiment, as shown in FIG. 2, the fixed assembly FA includes an outer frame 102 and a base 112. The outer frame 102 is fixedly connected to the base 112 and forms a first accommodation space AS1 which is configured to accommodate the first optical element OE1. The first optical element OE1 may be a reflective prism, but it is not limited thereto.

Figure 4:
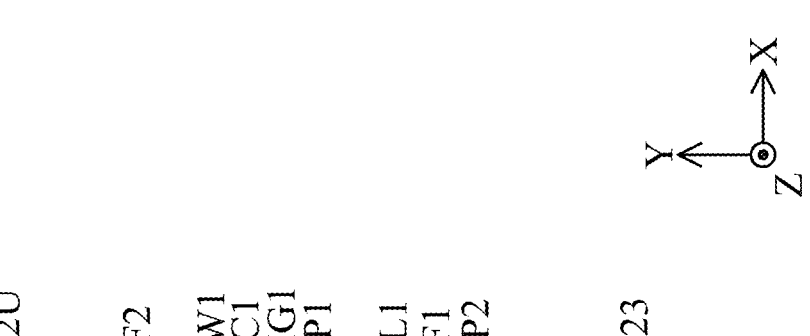
FIG. 4 is a top view of the first optical module 100A according to an embodiment of the present disclosure.
Figure 5:
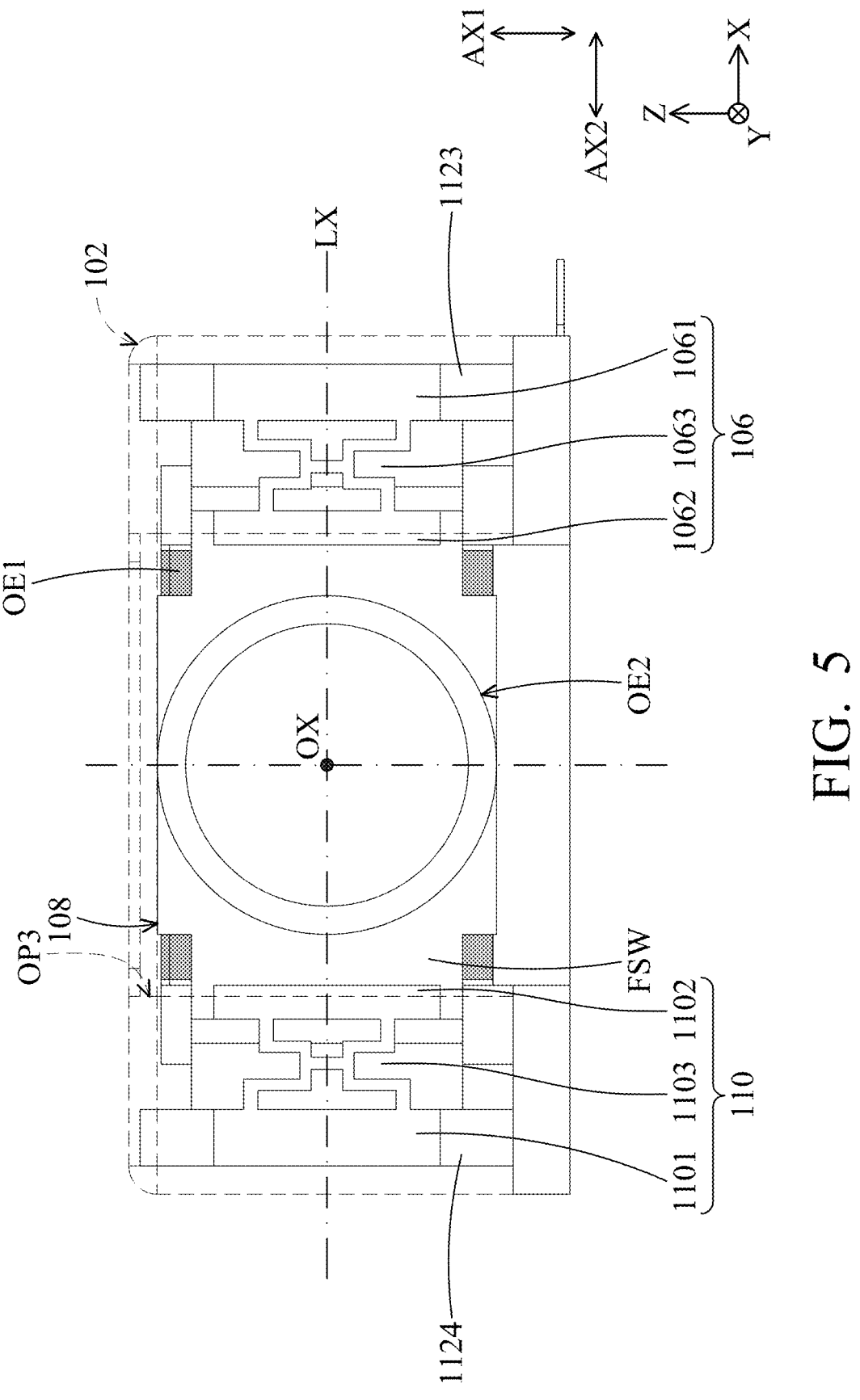
FIG. 5 is a font view of the first optical module 100A according to an embodiment of the present disclosure.

Please refer to FIG. 1 to FIG. 5. FIG. 4 is a top view of the first optical module 100A according to an embodiment of the present disclosure, and FIG. 5 is a font view of the first optical module 100A according to an embodiment of the present disclosure. It should be noted that, in order to clearly represent the internal structure, the outer frame 102 in the figures is drawn with a dotted line, which does not mean that the outer frame 102 does not exist. The following figures are the same.

As shown in FIG. 2 and FIG. 4, the movable part 108 may include a second accommodation space AS2 configured to accommodate the first optical element OE1, and the second accommodation space AS2 is located in the first accommodation space AS1.

In this embodiment, the second optical element OE2 may define an optical axis OX, and the optical axis OX passes through the second optical element OE2 and the first optical element OE1. As shown in FIG. 2 and FIG. 5, when viewed along the optical axis OX, the movable part 108 has a long strip-shaped structure.

Furthermore, the movable part 108 may include a first side wall SW1, a second side wall SW2 and a first opening OP1. When viewed along the optical axis OX, the first side wall SW1 is located on one side of the first optical element OE1. When viewed along the optical axis OX, the second side wall SW2 is located on the other side of the first optical element OE1. When viewed along the optical axis OX, the first optical element OE1 is located between the first side wall SW1 and the second side wall SW2.

In addition, the first opening OP1 corresponds to the first optical element OE1, and when viewed along the first axis AX1 (FIG. 4), at least a portion of the first optical element OE1 is exposed from the first opening OP1. The first axis AX1 is not parallel to the optical axis OX, for example, perpendicular to the optical axis OX.

As shown in FIG. 2, the movable part 108 further includes a top wall FSW and a second opening OP2. The top wall FSW corresponds to the second optical element OE2, and the second opening OP2 corresponds to the second optical element OE2 and is located on the top wall FSW. The optical axis OX passes through the second opening OP2, and the second opening OP2 is communicated with the first opening OP1.

The movable part 108 further includes a third side wall SW3 and a fourth side wall SW4. The third side wall SW3 is connected between the first side wall SW1 and the top wall FSW, and the fourth side wall SW4 is connected between the second side wall SW2 and the top wall FSW. When viewed along the first axis AX1, the third side wall SW3 and the fourth side wall SW4 each have an L-shaped structure.

In this embodiment, the outer frame 102 of the fixed assembly FA includes a third opening OP3. The third opening OP3 corresponds to the second optical element OE2, and the third opening OP3 also corresponds to the first optical element OE1. As shown in FIG. 5, when viewed along the optical axis OX, the third opening OP3 is larger than the second opening OP2.

As shown in FIG. 2, the outer frame 102 has a first outer wall 102FW and a second outer wall 102TW, and the first outer wall 102FW and the second outer wall 102TW each have a plate-shaped structure.

Specifically, the aforementioned third opening OP3 is formed by the first outer wall 102FW and the second outer wall 102TW, and the first outer wall 102FW and the second outer wall 102TW are perpendicular to each other. That is, the third opening OP3 may have an L-shaped structure.

As shown in FIG. 3, the aforementioned external light LT is incident on the third opening OP3 in a first direction D1, is reflected by the first optical element OE1, and then is emitted from the third opening OP3 in a second direction D2. The first direction D1 and the second direction D2 are not parallel to each other, for example, they are perpendicular to each other. In addition, the first direction D1 is parallel to the first axis AX1.

In addition, the base 112 has a base plate 1120 with a plate-shaped structure, and the base 112 of the fixed assembly FA further includes a first supporting portion 1121 which is disposed on the base 112 to accommodate and support the first optical element OE1. Specifically, the first supporting portion 1121 extends and protrudes along the first axis AX1 from the base plate 1120, and the first optical element OE1 is fixedly connected to the first supporting portion 1121 of the fixed assembly FA.

In this embodiment, when viewed along the first axis AX1, the first supporting portion 1121 has a U-shaped structure 112U and an inclined surface structure 112B. When viewed along the first axis AX1, the U-shaped structure 112U surrounds the inclined surface structure 112B, and the first optical element OE1 is fixedly disposed on the inclined surface structure 112B. The U-shaped structure 112U and the inclined surface structure 112B are integrally formed as one piece.

In this embodiment, the movable part 108 is movable relative to the first optical element OE1. Furthermore, as shown in FIG. 2 and FIG. 4, a first surface SF1 of the first side wall SW1 faces the first optical element OE1, and a second surface SF2 of the first side wall SW1 and the first surface SF1 face the opposite direction.

As shown in FIG. 4, there is a gap GP1 between the first surface SF1 and the base 112 of the fixed assembly FA, and there is a gap GP2 between the second surface SF2 and the outer frame 102 of the fixed assembly FA.

Similarly, a third surface SF3 of the second side wall SW2 faces the first optical element OE1, and a fourth surface SF4 of the second side wall SW2 and the third surface SF3 face opposite directions.

There is a gap GP3 between the third surface SF3 and the base 112 of the fixed assembly FA, there is a gap GP4 between the fourth surface SF4 and the outer frame 102 of the fixed assembly FA, and the third surface SF3 faces the first surface SF1. Based on this design, when the movable part 108 moves relative to the base 112, the movable part 108 does not collide with the base 112.

As shown in FIG. 2 and FIG. 4, the movable part 108 further includes a rear side wall RSW which is connected between the first side wall SW1 and the second side wall SW2. When viewed along the first axis AX1, there is a gap GP5 between the rear side wall RSW and the outer frame 102.

When viewed along the first axis AX1, the movable part 108 encloses the first optical element OE1, and when the movable part 108 is movable relative to the first optical element OE1, the movable part 108 is not in direct contact with the base 112.

Figure 6:
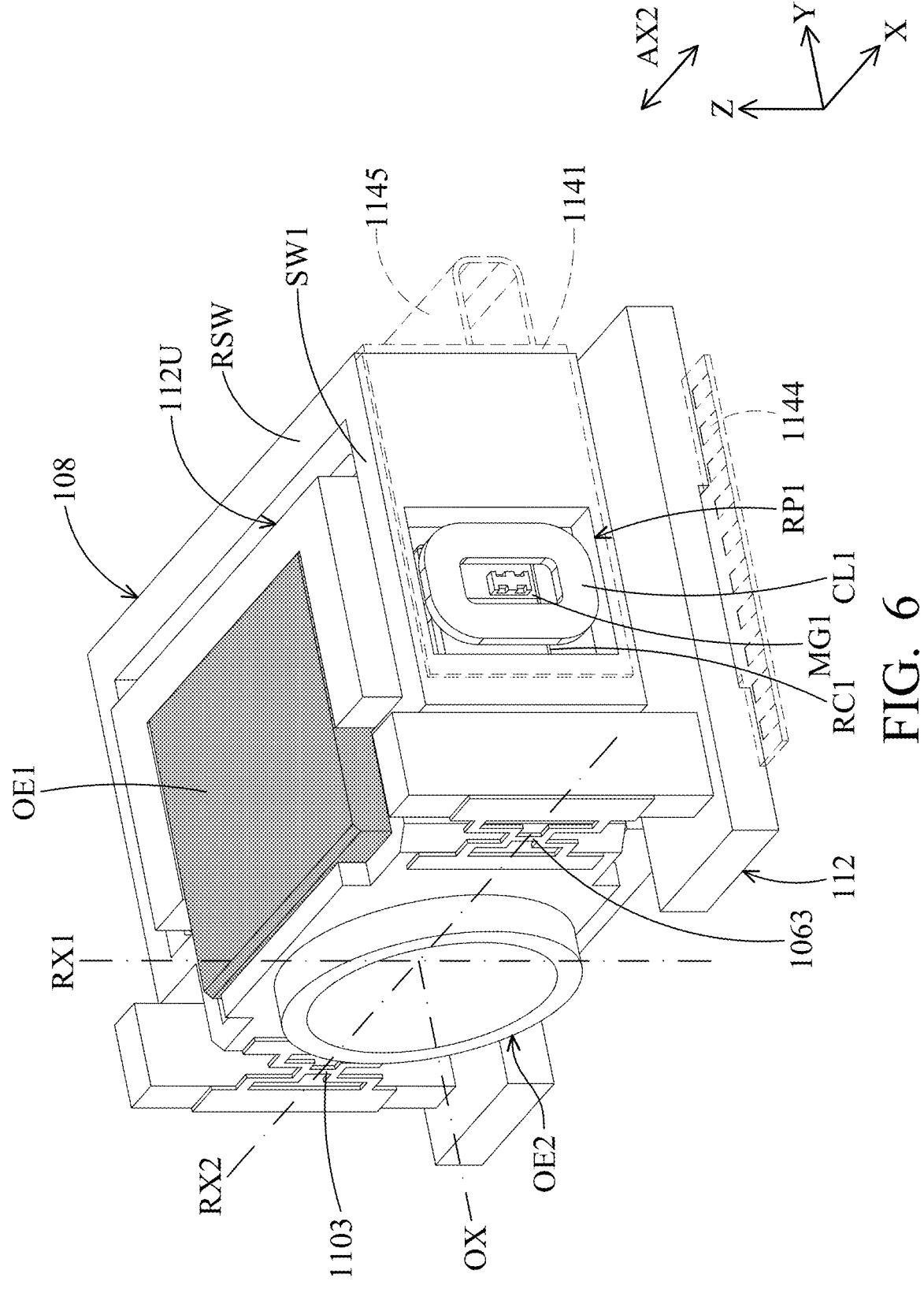
FIG. 6 is a perspective view of a partial structure of the first optical module 100A according to an embodiment of the present disclosure.
Figure 7:
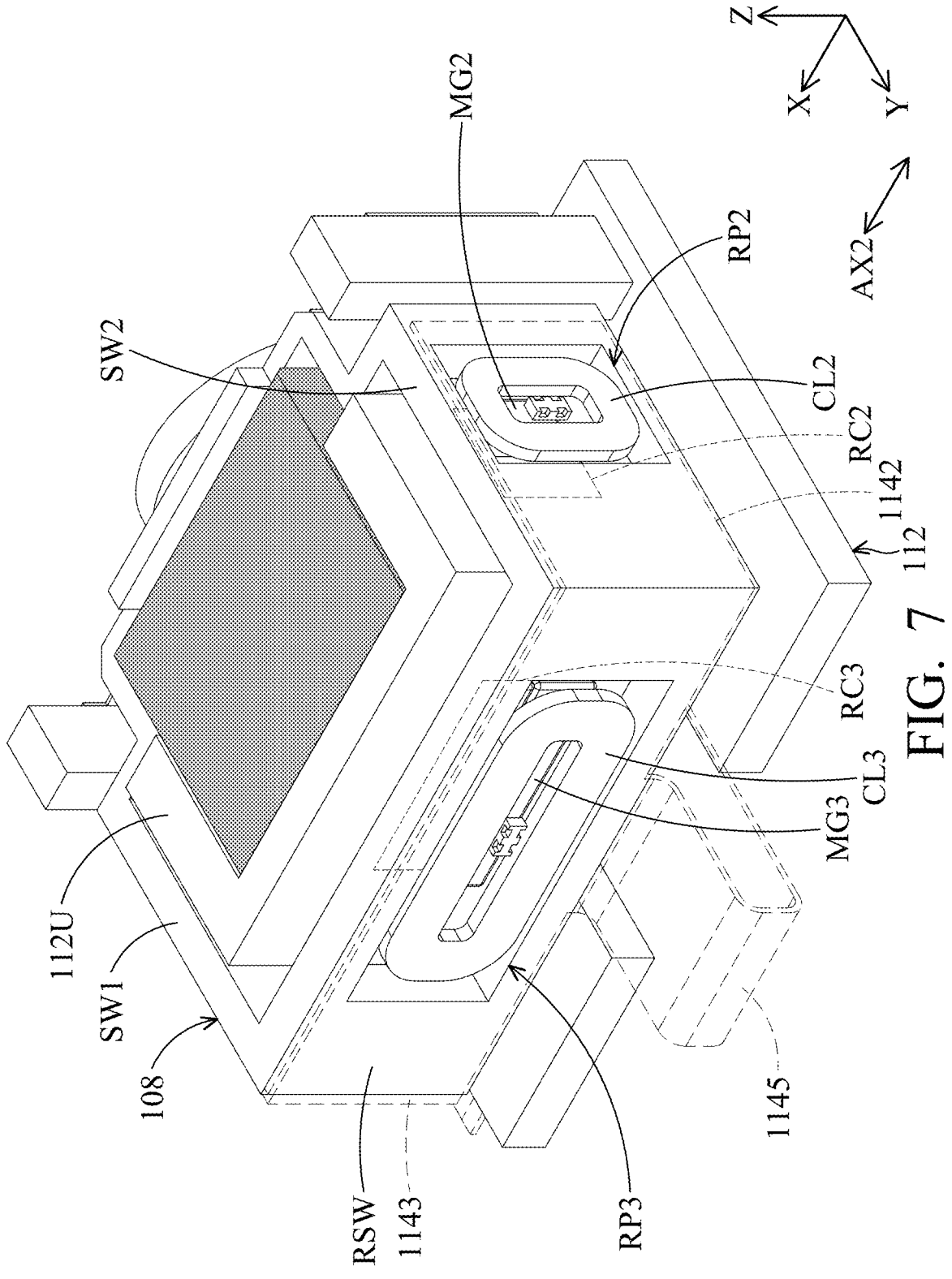
FIG. 7 is a perspective view of a partial structure of the first optical module 100A in another view according to an embodiment of the present disclosure.
Figure 8:
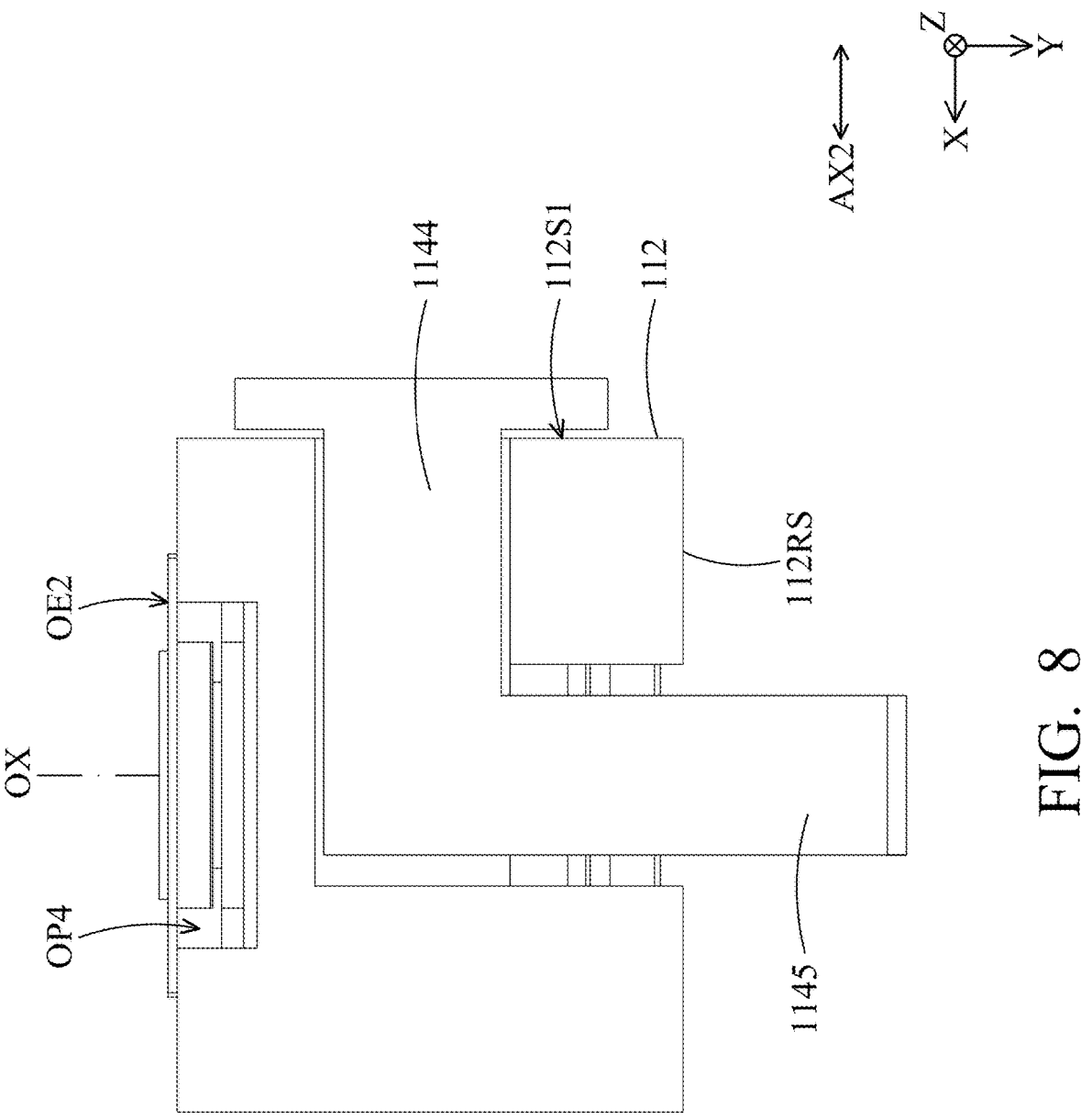
FIG. 8 is a bottom view of the first optical module 100A according to an embodiment of the present disclosure.

Please refer to FIG. 2 to FIG. 8. FIG. 6 is a perspective view of a partial structure of the first optical module 100A according to an embodiment of the present disclosure, FIG. 7 is a perspective view of a partial structure of the first optical module 100A in another view according to an embodiment of the present disclosure, and FIG. 8 is a bottom view of the first optical module 100A according to an embodiment of the present disclosure.

In this embodiment, a first accommodation groove RC1 and a second accommodation groove RC2 can be formed on the U-shaped structure 112U. As shown in FIG. 4, when viewed along the first axis AX1, the first accommodation groove RC1 and the second accommodation groove RC2 are located on opposite sides of the inclined surface structure 112B.

Furthermore, a third accommodation groove RC3 can be further formed on the U-shaped structure 112U. When viewed along the first axis AX1, the third accommodation groove RC3 is located between the first accommodation groove RC1 and the second accommodation groove RC2. Correspondingly, the driving assembly DA includes a first driving element MG1, a second driving element MG2 and a third driving element MG3, which are respectively accommodated in the first accommodation groove RC1, the second accommodation groove RC2 and the third accommodation groove RC3. The first driving element MG1, the second driving element MG2 and the third driving element MG3 may be magnets, but they are not limited thereto.

As shown in FIG. 2, the arrangement direction of the North-pole NP1 and South-pole SP1 of the first driving element MG1 is parallel to the optical axis OX, and the arrangement direction of the North-pole NP2 and South-pole SP2 of the second driving element MG2 is also parallel to the optical axis OX. In addition, the arrangement direction of the North-pole NP3 and South-pole SP3 of the third driving element MG3 is parallel to the first axis AX1.

Correspondingly, a first accommodation perforation RP1 and a second accommodation perforation RP2 are respectively formed on the first side wall SW1 and the second side wall SW2, and a third accommodation perforation RP3 is formed on the rear side wall RSW. The first accommodation perforation RP1, the second accommodation perforation RP2 and the third accommodation perforation RP3 respectively correspond to the first driving element MG1, the second driving element MG2 and the third driving element MG3.

As shown in FIG. 6 and FIG. 7, when viewed along a second axis AX2 (the X-axis), the first driving element MG1 and the second driving element MG2 are respectively exposed from the first accommodation perforation RP1 and the second accommodation perforation RP2. Similarly, as shown in FIG. 7, when viewed along the optical axis OX, the third driving element MG3 is exposed from the third accommodation perforation RP3.

Furthermore, the first optical module 100A of the optical element driving mechanism 100 further includes a circuit assembly 114. The circuit assembly 114 is a flexible printed circuit board. A portion of the circuit assembly 114 is affixed to the movable part 108, and the other portion of the circuit assembly 114 is fixedly disposed on the base 112 of the fixed assembly FA. It should be noted that in order to clearly show the internal structure, the circuit assembly 114 is drawn with a dotted line in some figures. This does not mean that the circuit assembly 114 does not exist. The following figures are the same.

Specifically, the circuit assembly 114 has a first circuit portion 1141 and a second circuit portion 1142, and the driving assembly DA further includes a first coil CL1 and a second coil CL2, which are respectively disposed on the first circuit portion 1141 and the second circuit portion 1142 and respectively correspond to the first driving element MG1 and the second driving element MG2.

Furthermore, the driving assembly DA may further include a third coil CL3 corresponding to the third driving element MG3, and the circuit assembly 114 may further include a third circuit portion 1143 which is connected between the first circuit portion 1141 and the second circuit portion 1142.

The third coil CL3 is fixedly disposed on the third circuit portion 1143, and the first coil CL1, the second coil CL2 and the third coil CL3 are respectively accommodated in the first accommodation perforation RP1, the second accommodation perforation RP2 and the third accommodation perforation RP3.

In this embodiment, the circuit assembly 114 further includes a bending portion 1145 and a fourth circuit portion 1144. The bending portion 1145 is connected between the third circuit portion 1143 and the fourth circuit portion 1144, and the fourth circuit portion 1144 is fixedly disposed on the base 112 and electrically connected to an external control circuit. The external control circuit is, for example, a control chip of a smartphone, but it is not limited thereto.

As shown in FIG. 8, when viewed along the first axis AX1, the base 112 overlaps a portion of the bending portion 1145, and the bending portion 1145 extends from a back side 112RS of the base 112. When viewed along the first axis AX, the fourth circuit portion 1144 extends along the second axis AX2. The fourth circuit portion 1144 extends from a side 11251 of the base 112, and the extending direction of the fourth circuit portion 1144 is different from the extending direction of the bending portion 1145.

For example, the fourth circuit portion 1144 extends along the second axis AX2, and the bending portion 1145 extends along the optical axis OX.

In addition, as shown in FIG. 4 and FIG. 8, the base 112 of the fixed assembly FA further includes a fourth opening OP4 corresponding to the second optical element OE2. As shown in FIG. 4, when viewed along the first axis AX1, the third opening OP3 overlaps at least portion of the fourth opening OP4, and the fourth opening OP4 is located at the base 112 (that is, formed by the base 112).

Then back to FIG. 2 and FIG. 5. In this embodiment, the optical element driving mechanism 100 further includes a connecting assembly CA, so that the movable part 108 is movably connected to the fixed assembly FA through the connecting assembly CA. The connecting assembly CA may include a first elastic member 106 and a second elastic member 110.

Specifically, as shown in FIG. 5, the first elastic member 106 and the second elastic member 110 respectively have a first flexible portion 1063 and a second flexible portion 1103, the first flexible portion 1063 has flexibility, and the second flexible portion 1103 has flexibility.

As shown in FIG. 5, when viewed along the optical axis OX, the first flexible portion 1063, the first optical element OE1, and the second flexible portion 1103 are arranged along a second axis AX2, and the second axis AX2 is not parallel to the first axis AX1 (that is, perpendicular to each other).

When viewed along the optical axis OX, a longitudinal axis LX of the movable part 108 with a long strip-shaped structure is parallel to the second axis AX2. When viewed along the optical axis OX, the first flexible portion 1063 and the second flexible portion 1103 are arranged along the second axis AX2. When viewed along the optical axis OX, the center of the second optical element OE2 is located between the first flexible portion 1063 and the second flexible portion 1103.

Furthermore, as shown in FIG. 5, the first elastic member 106 further has a first connecting end 1061 which is fixedly connected to the base 112 of the fixed assembly FA. Specifically, the first connecting end 1061 is affixed to a first setting portion 1123 of the fixed assembly FA.

Similarly, the first elastic member 106 further has a second connecting end 1062 which is fixedly connected to the top wall FSW of the movable part 108, and the first flexible portion 1063 is connected between the first connecting end 1061 and the second connecting end 1062.

Similarly, the second elastic member 110 may have a third connecting end 1101 which is fixedly connected to the base 112 of the fixed assembly FA. Specifically, the third connecting end 1101 is affixed to a second setting portion 1124 of the fixed assembly FA.

The second elastic member 110 further has a fourth connecting end 1102 which is fixedly connected to the top wall FSW of the movable part 108, and the second flexible portion 1103 is connected between the third connecting end 1101 and the fourth connecting end 1102.

As shown in FIG. 5, when viewed along the optical axis OX, the first setting portion 1123, the second optical element OE2 and the second setting portion 1124 are arranged along the second axis AX2.

Furthermore, as shown in FIG. 2 and FIG. 4, the third side wall SW3 and the fourth side wall SW4 each have a recessed structure, and the third side wall SW3 and the fourth side wall SW4 respectively correspond to the first setting portion 1123 and the second setting portion 1124.

The first setting portion 1123 and the second setting portion 1124 each has a columnar structure extending along the first axis AX1 from the base plate 1120, and the first setting portion 1123 and the second setting portion 1124 are not in contact with the movable part 108 and the first supporting portion 1121.

It should be noted that the first setting portion 1123, the second setting portion 1124, the first supporting portion 1121 and the base plate 1120 are integrally formed as one piece, but they are not limited thereto.

Furthermore, it is worth noting that, as shown in FIG. 5, when viewed along the optical axis OX, the first optical module 100A of the optical element driving mechanism 100 does not include any flexible portion which is arranged with the second optical element OE2 along the first axis AX1 (for example, a flexible portion similar to the first flexible portion 1063). Therefore, such a configuration can significantly reduce the height of the optical element driving mechanism 100 along the Z-axis so as to achieve the purpose of thinning.

In this embodiment, the first optical element OE1 and the second optical element OE2 may be made of different materials. For example, the first optical element OE1 and the second optical element OE2 may be in different material states. Specifically, the second optical element OE2 can be a liquid lens, and the first optical element OE1 can be a solid lens, but they are not limited thereto.

Figure 9:
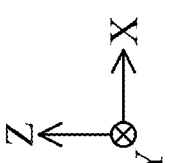
FIG. 9 is a front view of the first optical module 100A according to an embodiment of the present disclosure.
Figure 9:
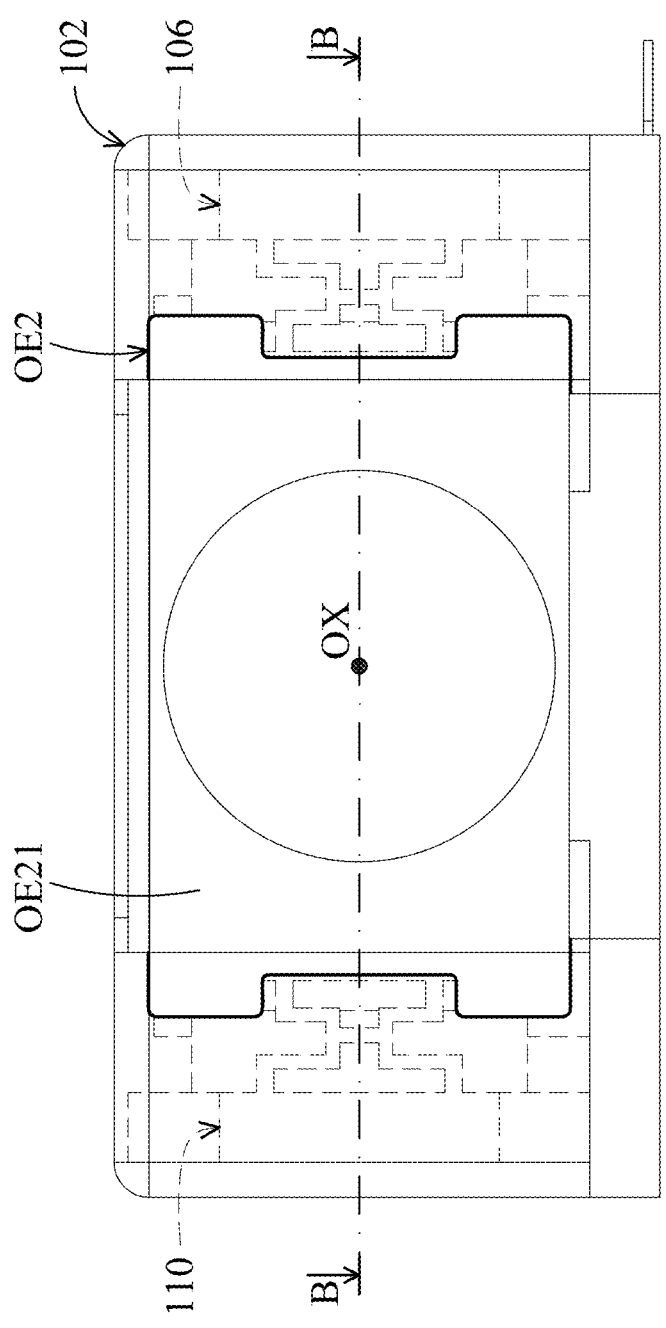
Figure 10:
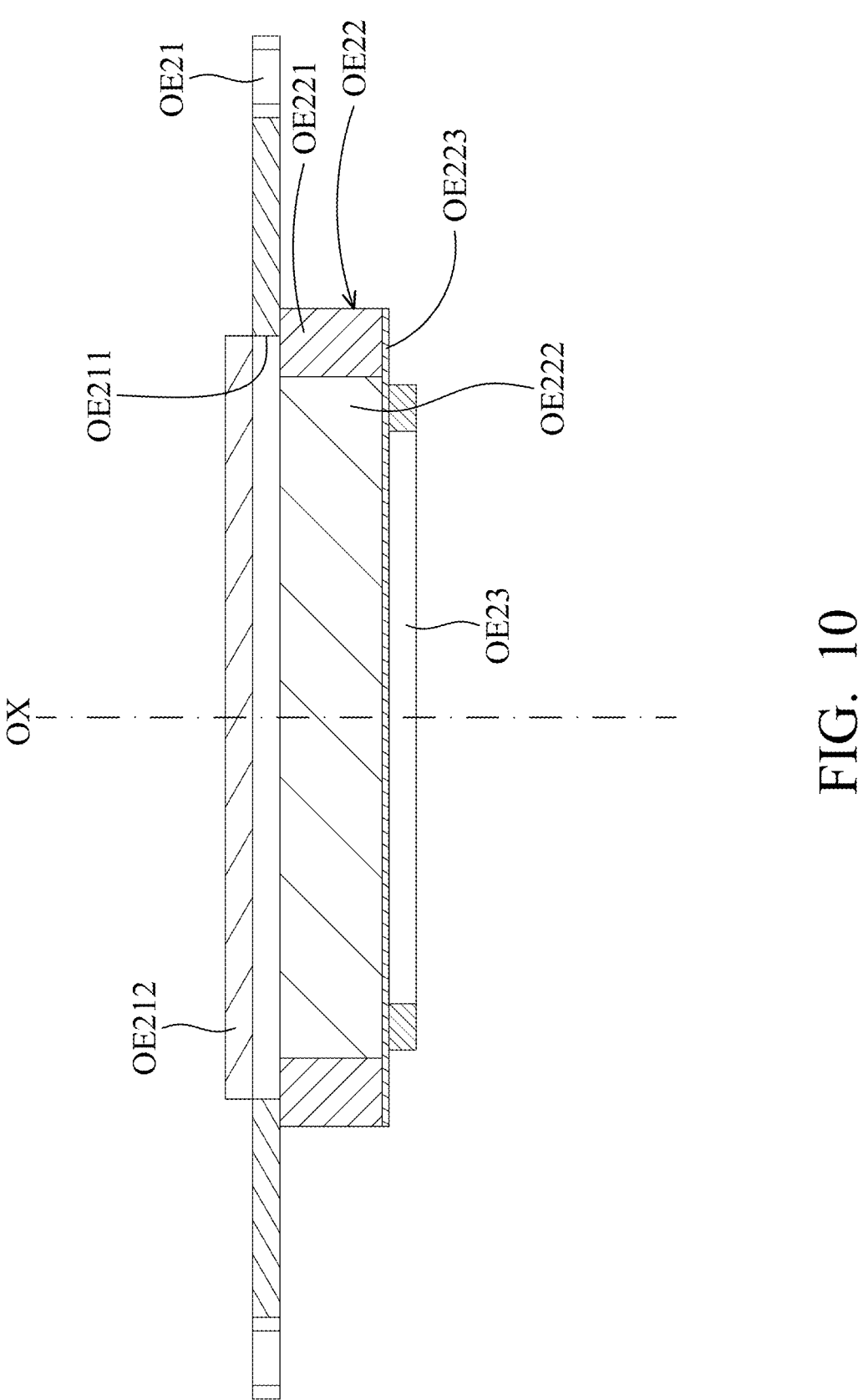
FIG. 10 is a cross-sectional view of the second optical element OE2 along the line B-B in FIG. 9 according to an embodiment of the present disclosure.

Next, please refer to FIG. 9 and FIG. 10. FIG. 9 is a front view of the first optical module 100A according to an embodiment of the present disclosure, and FIG. 10 is a cross-sectional view of the second optical element OE2 along the line B-B in FIG. 9 according to an embodiment of the present disclosure. In this embodiment, the second optical element OE2 may include an optical fixed portion OE21, a main body OE22 and a pushing portion OE23.

As shown in FIG. 9 and FIG. 10, the optical fixed portion OE21 has a plate-shaped structure which is fixedly connected to the outer frame 102 of the fixed assembly FA. For example, the optical fixed portion OE21 and the outer frame 102 are both made of metal material, so that the optical fixed portion OE21 can be affixed to the outer frame 102 of the fixed assembly FA by laser welding (the position of the laser welding is shown by the bold lines in the figures). It is important to note that the optical fixed portion OE21 is not elastic or flexible.

In addition, as shown in FIG. 9, when viewed along the optical axis OX, the optical fixed portion OE21 overlaps at least portion of the connecting assembly CA, such as overlapping the first elastic member 106 and the second elastic member 110.

Furthermore, the optical fixed portion OE21 has an optical opening OE211, so that the aforementioned external light LT can pass through the main body OE22 along the optical axis OX. The optical fixed portion OE21 may further have a translucent element OE212, such as a lens, which is fixedly disposed on the optical fixed portion OE21.

The main body OE22 may have an accommodation frame OE221 to accommodate the liquid OE222 therein, and a thin film OE223 is provided on the bottom of the accommodation frame OE221 to seal the liquid OE222 within the accommodation frame OE221.

Furthermore, the pushing portion OE23 has a ring-shaped structure which is fixedly connected to the movable part 108 and the thin film OE223 and located between the movable part 108 and the thin film OE223. The pushing portion OE23 can be driven by the movable part 108 to push the thin film OE223 and the liquid OE222.

Figure 11:
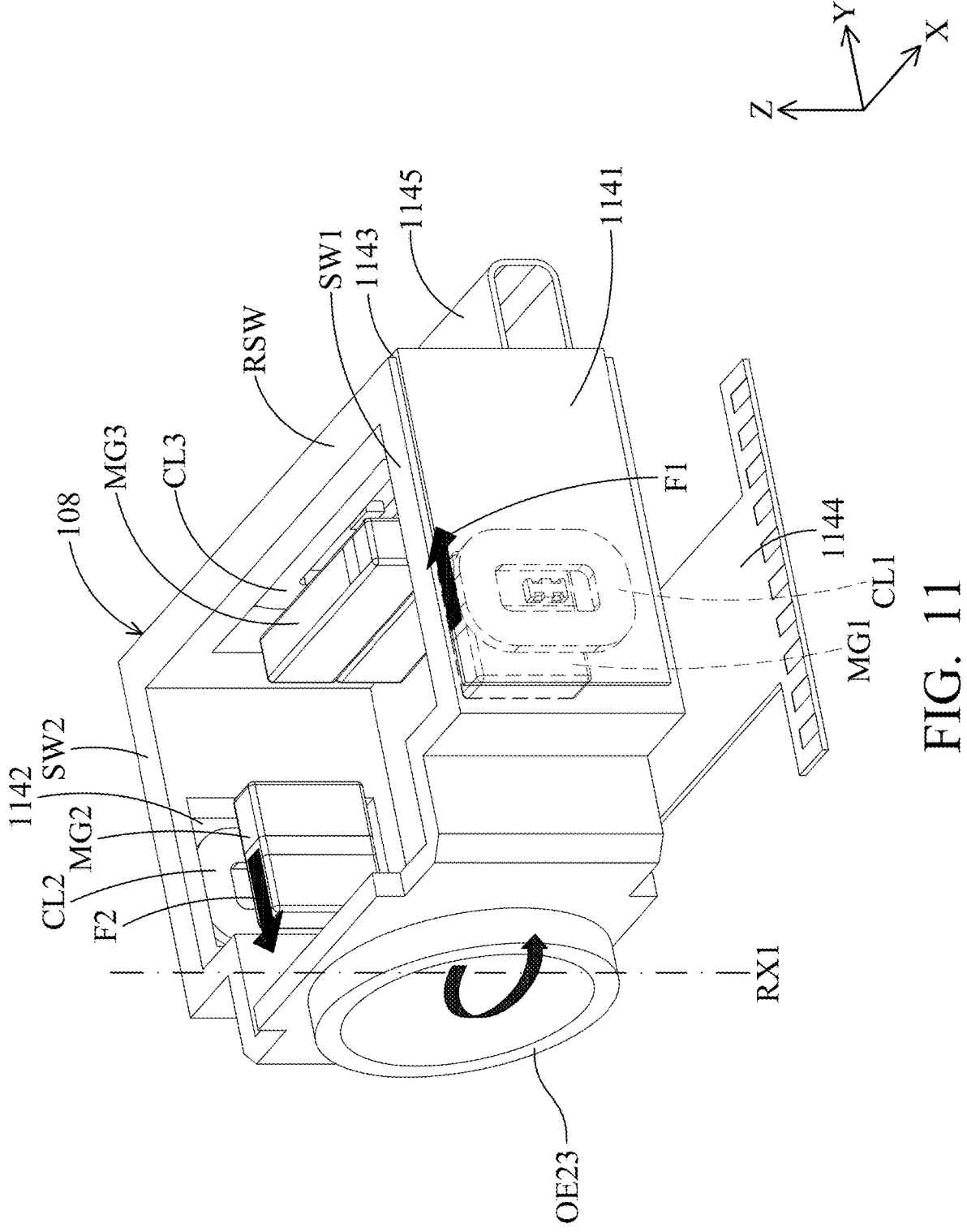
FIG. 11 and FIG. 12 are schematic three-dimensional diagrams illustrating that the driving assembly DA drives the movable part 108 to rotate around different axes according to an embodiment of the present disclosure.
Figure 12:
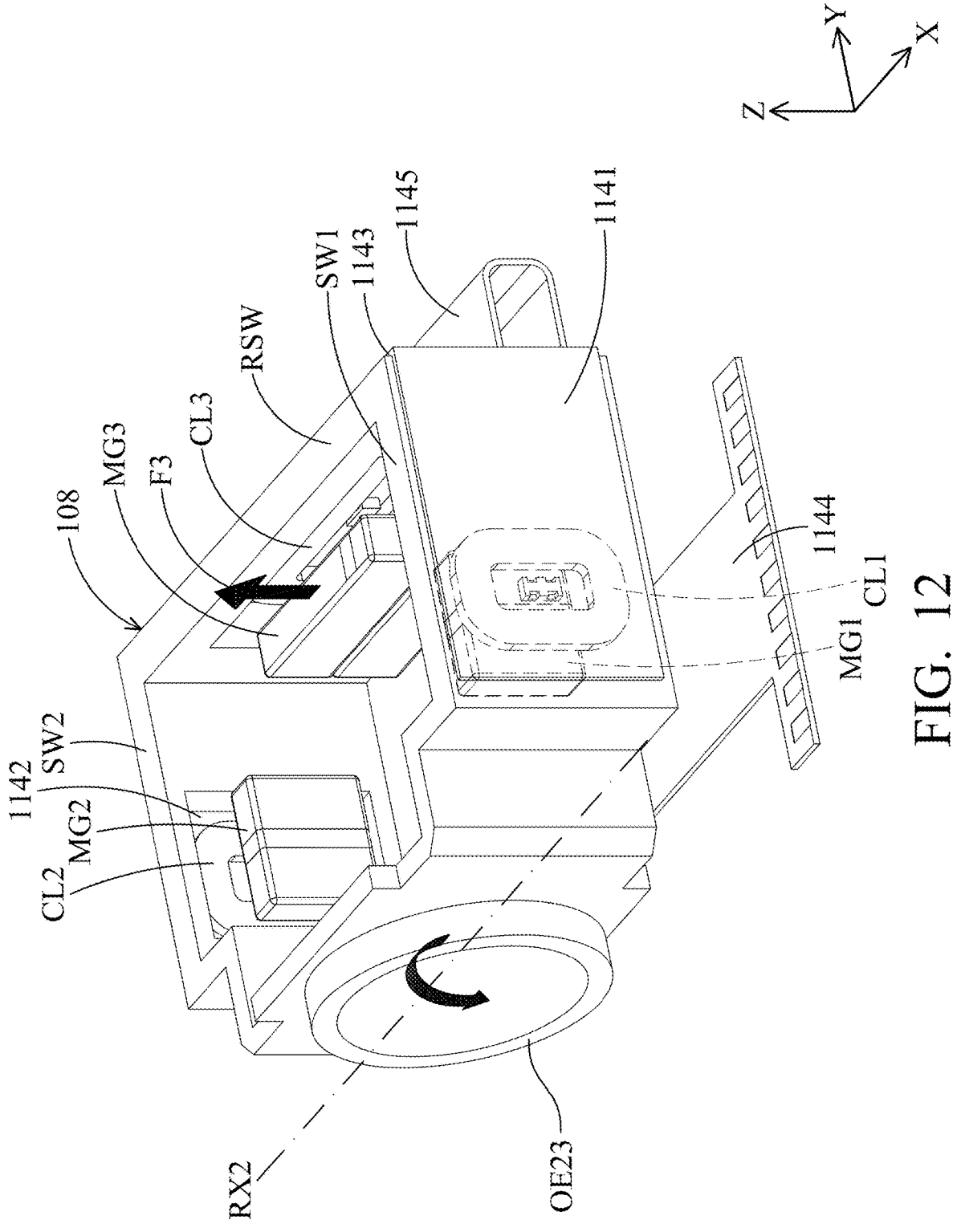

Next, please refer to FIG. 6, FIG. 11 and FIG. 12. FIG. 11 and FIG. 12 are schematic three-dimensional diagrams illustrating that the driving assembly DA drives the movable part 108 to rotate around different axes according to an embodiment of the present disclosure. In this embodiment, as shown in FIG. 11, when the first coil CL1 and the second coil CL2 respectively act with the first driving element MG1 and the second driving element MG2 to generated the electromagnetic driving forces F1 and F2 (the resultant force of them can be called the first electromagnetic driving force), the first coil CL1 and the second coil CL2 drive the movable part 108 to rotate around a first rotation axis RX1 relative to the base 112, so that the pushing portion OE23 pushes the main body OE22 to change the optical properties of the second optical element OE2.

On the other hand, as shown in FIG. 12, when the third coil CL3 acts with the third driving element MG3 to generate the electromagnetic driving force F3 (the second electromagnetic driving force), the third coil CL3 drives the movable part 108 to rotate around a second rotation axis RX2 relative to the base 112, so that the pushing portion OE23 pushes the main body OE22 to change the optical properties of the second optical element OE2. The first rotation axis RX1 is perpendicular to the second rotation axis RX2.

It is worth noting that the first circuit portion 1141, the second circuit portion 1142 and the third circuit portion 1143 are respectively fixedly disposed on the first side wall SW1, the second side wall SW2 and the rear side wall RSW of the movable part 108. Therefore, when the movable part 108 moves relative to the base 112, the first circuit portion 1141, the second circuit portion 1142 and the third circuit portion 1143 move with the movable part 108 relative to the fourth circuit portion 1144 and the base 112.

In addition, as shown in FIG. 6, when viewed along the optical axis OX, the first rotation axis RX1 is located between the first flexible portion 1063 and the second flexible portion 1103, and the first rotation axis RX1 can intersect with the optical axis OX.

As shown in FIG. 6, when viewed along the optical axis OX, the second rotation axis RX2 passes through the first flexible portion 1063 and the second flexible portion 1103, and the second rotation axis RX2 can intersect with the first rotation axis RX1 and the optical axis OX, but it is not limited thereto.

Figure 13:
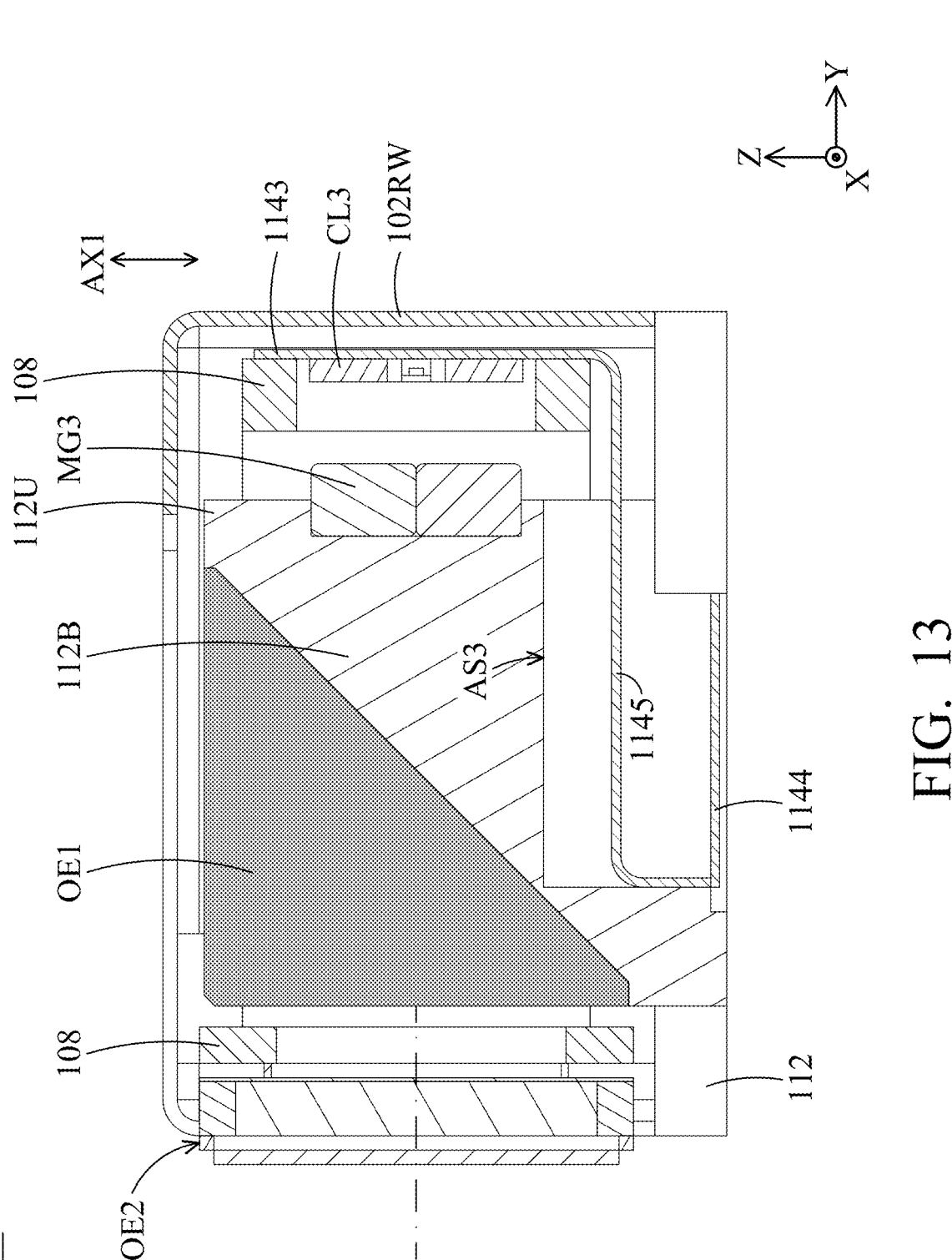
FIG. 13 is a cross-sectional view of a first optical module 100A' according to another embodiment of the present disclosure.
Figure 14:
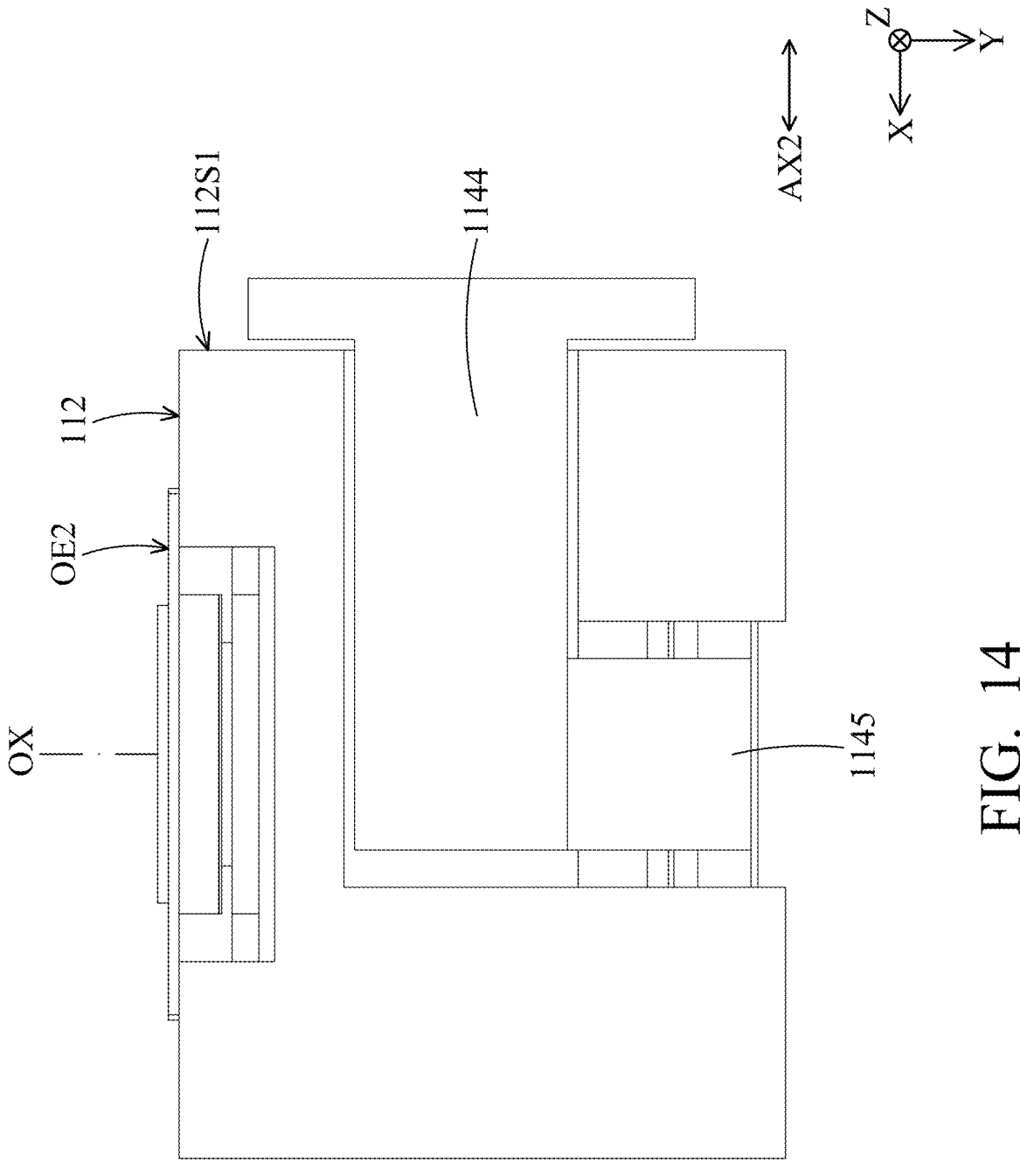
FIG. 14 is a bottom view of the first optical module 100A' according to another embodiment of the present disclosure.

Next, please refer to FIG. 13 and FIG. 14. FIG. 13 is a cross-sectional view of a first optical module 100A' according to another embodiment of the present disclosure, and FIG. 14 is a bottom view of the first optical module 100A' according to another embodiment of the present disclosure. In this embodiment, the circuit assembly 114 also includes a bending portion 1145 and a fourth circuit portion 1144, and the bending portion 1145 is connected between the third circuit portion 1143 and the fourth circuit portion 1144.

As shown in FIG. 13, when viewed along the first axis AX1, a back side wall 102RW of the outer frame 102 does not overlap the bending portion 1145. Specifically, the bending portion 1145 is bent from the third circuit portion 1143 toward the inclined surface structure 112B, so that the bending portion 1145 does not contact the back side wall 102RW.

In this embodiment, a third accommodation space AS3 is formed on the first supporting portion 1121 and is configured to accommodate the bending portion 1145. When viewed along the first axis AX1, the inclined surface structure 112B overlaps a portion of the third accommodation space AS3.

When viewed along the first axis AX1, the inclined surface structure 112B overlaps a portion of the bending portion 1145.

As shown in FIG. 14, when viewed along the first axis AX1, the fourth circuit portion 1144 extends along the second axis AX2. The fourth circuit portion 1144 extends from the side 112S1 of the base 112, and the extending direction of the fourth circuit portion 1144 is different from the extending direction of the bending portion 1145. Specifically, the fourth circuit portion 1144 extends along the second axis AX2, and the bending portion 1145 extends along the optical axis OX.

Based on this structural configuration, the bending portion 1145 can be accommodated in the third accommodation space AS3 without being exposed from the fixed assembly FA. Therefore, it can not only achieve the purpose of protecting the circuit assembly 114, but also achieve the advantage of miniaturization.

The present disclosure provides an optical element driving mechanism 100, which can be a periscope lens mechanism, including a fixed assembly FA, a driving assembly DA, a movable part 108 and a connecting assembly CA. The movable part 108 is movably connected to the base 112 of the fixed assembly FA through the connecting assembly CA, and the movable part 108 surrounds the first optical element OE1. The optical fixed portion OE21 of the second optical element OE2 is affixed to the outer frame 102 of the fixed assembly FA, and the pushing portion OE23 is fixedly connected to the movable part 108.

The driving assembly DA is configured to drive the movable part 108 to move relative to the base 112 and the first optical element OE1 to drive the pushing portion OE23 to push the thin film OE223 and the liquid OE222, thereby changing the optical properties of the second optical element OE2, so as to achieve the purpose of optical image stabilization. Because there is a gap between the movable part 108 and the base 112, the movable part 108 does not collide with the base 112 and cause damage when rotating.

It is worth noting that the first circuit portion 1141 to third circuit portion 1143 of the circuit assembly 114 are affixed to the movable part 108. Therefore, when the movable part 108 moves relative to the base 112, the first circuit portion 1141 to the third circuit portion 1143 also move relative to the fourth circuit portion 1144 of the circuit assembly 114, and the bending portion 1145 is also driven by the third circuit portion 1143. Based on such a configuration, the overall weight of the movable part 108 can be greatly reduced, and in some embodiments, the weight of the first driving element MG1 and the second driving element MG2 can also be correspondingly reduced, thereby achieving the purpose of reducing the weight.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism for accommodating a first optical element and comprising:
   a fixed assembly:
   a movable part, configured to be connected to a second optical element, wherein the second optical element corresponds to the first optical element and defines an optical axis, and the movable part is movable relative to the fixed assembly; and
   a driving assembly, configured to drive the movable part to move relative to the fixed assembly;
   wherein the fixed assembly includes a first accommodation space configured to accommodate the first optical element;
   wherein the movable part further includes a first side wall, a second side wall and a rear side wall which is connected between the first side wall and the second side wall;
   wherein the driving assembly includes a first driving element, a second driving element, and a third driving element;
   wherein a first accommodation perforation and a second accommodation perforation are respectively formed on the first side wall and the second side wall;
   a third accommodation perforation is formed on the rear side wall;
   the first accommodation perforation, the second accommodation perforation and the third accommodation perforation respectively correspond to the first driving element, the second driving element and the third driving element;
   when viewed along a second axis that is perpendicular to the optical axis, the first driving element and the second driving element are respectively exposed from the first accommodation perforation and the second accommodation perforation;
   when viewed along the optical axis, the third driving element is exposed from the third accommodation perforation.

2. The optical element driving mechanism as claimed in claim 1, wherein
   the movable part includes a second accommodation space configured to accommodate the first optical element;
   the second accommodation space is located in the first accommodation space;
   the optical axis passes through the second optical element and the first optical element; and
   when viewed along the optical axis, the movable part has a long strip-shaped structure.

3. The optical element driving mechanism as claimed in claim 2, wherein
   the fixed assembly further includes a base and an outer frame;
   the outer frame is fixedly connected to the base and forms the first accommodation space;
   the base has a base plate with a plate-shaped structure;
   the fixed assembly further includes a first supporting portion which is disposed on the base to accommodate the first optical element;
   the first supporting portion extends and protrudes along a first axis from the base plate;
   the first axis is not parallel to the optical axis; and the first optical element is fixedly connected to the first supporting portion.

4. The optical element driving mechanism as claimed in claim 3, wherein when viewed along the first axis, the first supporting portion has a U-shaped structure and an inclined surface structure;

when viewed along the first axis, the U-shaped structure surrounds the inclined surface structure;

the first optical element is disposed on the inclined surface structure;

a first accommodation groove and a second accommodation groove are formed on the U-shaped structure; and when viewed along the first axis, the first accommodation groove and the second accommodation groove are located on opposite sides of the inclined surface structure.

5. The optical element driving mechanism as claimed in claim 4, wherein a third accommodation groove is formed on the U-shaped structure;

when viewed along the first axis, the third accommodation groove is located between the first accommodation groove and the second accommodation groove;

the first driving element, the second driving element and the third driving element are respectively accommodated in the first accommodation groove, the second accommodation groove and the third accommodation groove;

arrangement directions of the North-pole and South-pole of each of the first driving element and the second driving element are parallel to the optical axis; and an arrangement direction of the North-pole and South-pole of the third driving element is parallel to the first axis.

6. The optical element driving mechanism as claimed in claim 5, wherein the movable part further includes a first opening;

when viewed along the optical axis, the first side wall is located on one side of the first optical element;

when viewed along the optical axis, the second side wall is located on other side of the first optical element;

when viewed along the optical axis, the first optical element is located between the first side wall and the second side wall;

the first opening corresponds to the first optical element; and when viewed along the first axis, at least a portion of the first optical element is exposed from the first opening.

7. The optical element driving mechanism as claimed in claim 6, wherein the movable part further includes a top wall and a second opening;

the top wall corresponds to the second optical element;

the second opening corresponds to the second optical element and is located on the top wall;

the optical axis passes through the second opening;

the movable part further includes a third side wall and a fourth side wall;

the third side wall is connected between the first side wall and the top wall; and the fourth side wall is connected between the second side wall and the top wall.

8. The optical element driving mechanism as claimed in claim 7, wherein when viewed along the first axis, the third side wall and the fourth side wall each has an L-shaped structure;

when viewed along the first axis, there is a gap between the rear side wall and the outer frame;

when viewed along the first axis, the movable part encloses the first optical element;

the movable part is movable relative to the first optical element; and the movable part is not in direct contact with the base.

9. The optical element driving mechanism as claimed in claim 1, wherein the optical element driving mechanism further includes a circuit assembly, a portion of the circuit assembly is fixedly disposed on the movable part, and other portion of the circuit assembly is fixedly disposed on the base of the fixed assembly;

the circuit assembly has a first circuit portion and a second circuit portion;

the driving assembly further includes a first coil and a second coil, respectively disposed on the first circuit portion and the second circuit portion and respectively corresponding to the first driving element and the second driving element;

the driving assembly further includes a third coil corresponding to the third driving element;

the circuit assembly further includes a third circuit portion which is connected between the first circuit portion and the second circuit portion;

the third coil is fixedly disposed on the third circuit portion; and the first coil, the second coil and the third coil are respectively accommodated in the first accommodation perforation, the second accommodation perforation and the third accommodation perforation.

10. The optical element driving mechanism as claimed in claim 9, wherein the circuit assembly further includes a bending portion and a fourth circuit portion;

the bending portion is connected between the third circuit portion and the fourth circuit portion;

the fourth circuit portion is fixedly disposed on the base and is electrically connected to an external control circuit;

when viewed along the first axis, the base overlaps a portion of the bending portion, and the bending portion extends from a back side of the base;

when viewed along the first axis, the fourth circuit portion extends along the second axis; and the fourth circuit portion extends from a side of the base, and an extending direction of the fourth circuit portion is different from an extending direction of the bending portion.

11. The optical element driving mechanism as claimed in claim 10, wherein the first coil and the second coil are configured to respectively act with the first driving element and the second driving element to generate a first electromagnetic driving force, thereby driving the movable part to rotate around a first rotation axis, so that a pushing portion of the second optical element pushes a main body of the second optical element to change the optical properties of the second optical element.

12. The optical element driving mechanism as claimed in claim 11, wherein the third coil is configured to act with the third driving element to generate a second electromagnetic driving force, thereby driving the movable part to rotate around a second rotation axis, so that the pushing portion pushes the main body to change optical properties of the second optical element;

the first rotation axis is perpendicular to the second rotation axis;

the first circuit portion, the second circuit portion and the third circuit portion are respectively fixedly disposed on the first side wall, the second side wall and the rear side wall of the movable part; and when the movable part moves relative to the base, the first circuit portion, the second circuit portion and the third circuit portion move with the movable part relative to the fourth circuit portion.

13. The optical element driving mechanism as claimed in claim 12, wherein the optical element driving mechanism further includes a connecting assembly, so that the movable part is movably connected to the fixed assembly through the connecting assembly;

the connecting assembly includes a first elastic member and a second elastic member;

the first elastic member and the second elastic member respectively have a first flexible portion and a second flexible portion;

the first flexible portion has flexibility;

the second flexible portion has flexibility;

when viewed along the optical axis, the first flexible portion and the first optical element are arranged along the second axis;

when viewed along the optical axis, a longitudinal axis of the movable part with a long strip-shaped structure is parallel to the second axis;

when viewed along the optical axis, the first flexible portion and the second flexible portion are arranged along the second axis; and when viewed along the optical axis, a center of the second optical element is located between the first flexible portion and the second flexible portion.

14. The optical element driving mechanism as claimed in claim 13, wherein the first elastic member has a first connecting end which is fixedly connected to the fixed assembly;

the first connecting end is affixed to a first setting portion of the fixed assembly;

the first elastic member further has a second connecting end which is fixedly connected to the movable part;

the first flexible portion is connected between the first connecting end and the second connecting end;

the second elastic member has a third connecting end which is fixedly connected to the fixed assembly;

the third connecting end is affixed to a second setting portion of the fixed assembly;

the second elastic member further has a fourth connecting end which is fixedly connected to the movable part;

the second flexible portion is connected between the third connecting end and the fourth connecting end; and when viewed along the optical axis, the first setting portion, the second optical element and the second setting portion are arranged along the second axis.

15. The optical element driving mechanism as claimed in claim 14, wherein the third side wall and the fourth side wall each have a recessed structure;

the third side wall and the fourth side wall respectively correspond to the first setting portion and the second setting portion;

the first setting portion and the second setting portion are not in contact with the movable part and the first supporting portion; and the first setting portion, the second setting portion, the first supporting portion and the base plate of the base are integrally formed as one piece.

16. The optical element driving mechanism as claimed in claim 15, wherein when viewed along the optical axis, the first rotation axis is located between the first flexible portion and the second flexible portion;

when viewed along the optical axis, the second rotation axis passes through the first flexible portion and the second flexible portion;

the first optical element and the second optical element have different materials;

the first optical element and the second optical element have different material states;

the second optical element is a liquid lens;

the first optical element includes a solid lens;

the second optical element further includes an optical fixed portion;

the optical fixed portion is fixedly connected to the fixed assembly;

the optical fixed portion is affixed to the fixed assembly by laser welding;

the optical axis passes through the main body;

the pushing portion has a ring-shaped structure; and when viewed along the optical axis, the optical fixed portion overlaps at least a portion of the connecting assembly.

17. The optical element driving mechanism as claimed in claim 16, wherein the fixed assembly further includes a third opening;

the third opening corresponds to the second optical element;

the third opening corresponds to the first optical element;

when viewed along the optical axis, the third opening is larger than the second opening;

the outer frame has a first outer wall and a second outer wall;

the first outer wall and the second outer wall each have a plate-shaped structure;

the third opening is formed by the first outer wall and the second outer wall;

the first outer wall and the second outer wall are perpendicular to each other;

an external light is incident on the third opening in a first direction and is emitted in a second direction from the third opening; and the first direction is not parallel to the second direction.

18. The optical element driving mechanism as claimed in claim 17, wherein a first surface of the first side wall faces the first optical element;

a second surface of the first side wall and the first surface face opposite directions;

there is a gap between the first surface and the fixed assembly;

there is another gap between the second surface and the fixed assembly;

a third surface of the second side wall faces the first optical element;

a fourth surface of the second side wall and the third surface face opposite directions;

there is another gap between the third surface and the fixed assembly;

there is another gap between the fourth surface and the fixed assembly;

the third surface faces the first surface;

the fixed assembly further includes a fourth opening corresponding to the second optical element;

when viewed along the first axis, the third opening overlaps at least a portion of the fourth opening; and the fourth opening is located at the base.

19. The optical element driving mechanism as claimed in claim 9, wherein the circuit assembly further includes a bending portion and a fourth circuit portion;

the bending portion is connected between the third circuit portion and the fourth circuit portion;

the fourth circuit portion is fixedly disposed on the base and is electrically connected to an external control circuit;

when viewed along the first axis, a back side wall of the outer frame does not overlap the bending portion;

the first supporting portion forms a third accommodation space configured to accommodate the bending portion;

when viewed along the first axis, the inclined surface structure overlaps a portion of the third accommodation space;

when viewed along the first axis, the inclined surface structure overlaps a portion of the bending portion;

when viewed along the first axis, the fourth circuit portion extends along the second axis; and the fourth circuit portion extends from a side of the base, and an extending direction of the fourth circuit portion is different from an extending direction of the bending portion.

* * * * *